Nov. 11, 1952         W. H. KUNTZ         2,617,308

IRREVERSIBLE CONTROL LINKAGE

Filed Dec. 4, 1950         2 SHEETS—SHEET 1

INVENTOR.
WILLIAM H. KUNTZ
BY
Russell C. Lane

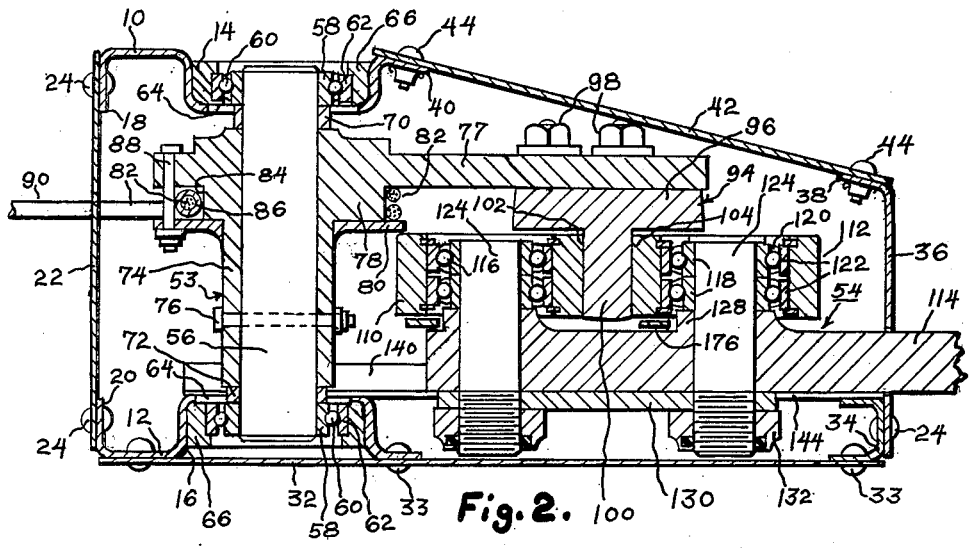
Fig. 2.
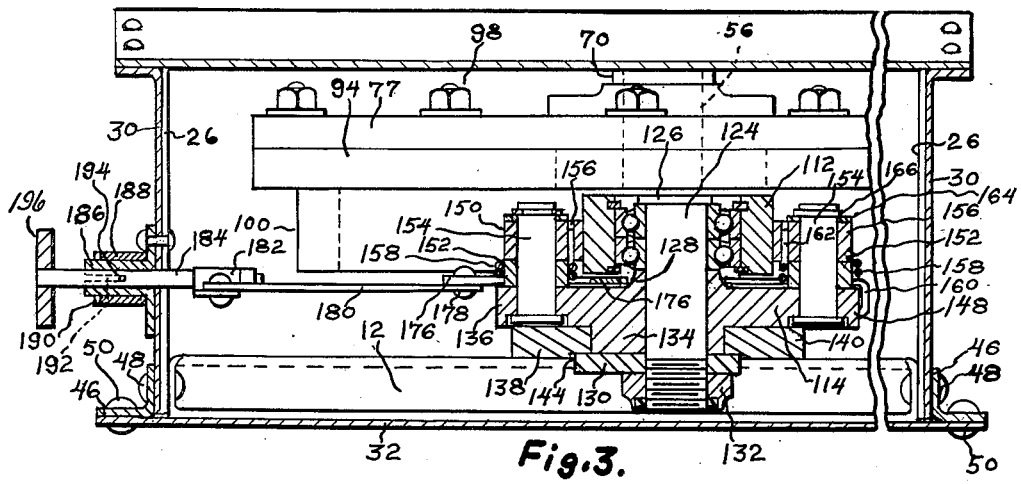
Fig. 3.
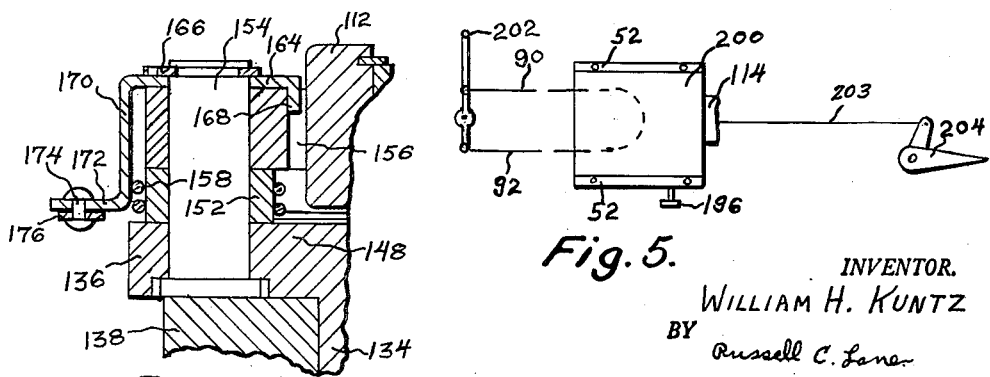
Fig. 4.
Fig. 5.
INVENTOR.
WILLIAM H. KUNTZ
BY Russell C. Lane Patented Nov. 11, 1952

2,617,308

UNITED STATES PATENT OFFICE 2,617,308

IRREVERSIBLE CONTROL LINKAGE

William H. Kuntz, Dayton, Ohio

Application December 4, 1950, Serial No. 199,040

6 Claims. (Cl. 74—107)

1

This invention relates to controls and linkage between a primary control lever and a device or member to be operated according to some schedule, where a reversible linkage or coupling can not always be tolerated but may sometimes be desirable or in fact necessary. In some instances, particularly in the movement of control surfaces and other devices of aircraft, the movement of the controlled member does not follow a constant factor of rate or degree of movement with respect to the primary control lever. There is need of a linkage giving an accelerated movement of the operated member at one end and a decelerated movement of the operated member at the other end of a range of movement, with respect to normal movement at some intermediate point.

The device represented is a mechanism so arranged as to transmit motion from an input member to an output member according to some selected schedule, and has for an object to provide for the easy transmission of the forces and motion from the input member to the output member, in a highly efficient manner, while operating at such a low efficiency when reversely transmitting force and motion from the output member to the input member, that the mechanism is irreversible. In addition, means are provided to increase the efficiency from output to input when so desired to enable the mechanism to become reversible.

The mechanism is relatively simple, and consists, in this configuration, of a cam surface contacting rollers carried by a slide. The cam and slide may be mounted in any suitable manner; in this case, the cam is mounted on a shaft which is rotatably mounted in ball bearings within the frame. A cable represents the input member which is attached to a drum forming an integral part of the cam mounting in such a manner as to be able to cause a turning effect of the cam about the shaft axis. The cam has two operating surfaces relatively close together and equidistant from a centerline, which is defined mathematically as a logarithmic spiral. The slide is carried by a main frame in such a way as to be freely slidable between guides attached to the frame. The slide carries two rollers rotatably mounted on the stud and each contact one of the cam surfaces without backlash, or clearance.

Near each roller are two brake shoes also carried by the slide and rotatably mounted on studs. The brakeshoes are urged to rotate in a clockwise direction by means of a coil spring which normally set the brakes against the rollers. Brake lifting arms are rotatably mounted on the stud and have small fingers turned down at each side in such a way as to engage the sides of the brake shoes. The arms are connected together by links which in turn connect to a cross-arm attached to the end of a handle for setting and releasing the brakes.

2

Further objects and advantages of the present invention will be apparent from the accompanying specification and claims with the drawings, which generally illustrate one embodiment of my invention.

In the drawings:

Fig. 2 is a vertical sectional view substantially as indicated by line and arrows 2—2 of Fig. 1.

Fig. 3 is a transverse sectional view substantially indicated by the line and arrows 3—3 of Fig. 1.

Fig. 4 is a sectional view substantially as indicated by the line and arrows 4—4 of Fig. 1, and showing details of the brake shoe and releasing means.

Fig. 5 illustrates one adaptation of the proposed control linkage.

Figure 1:
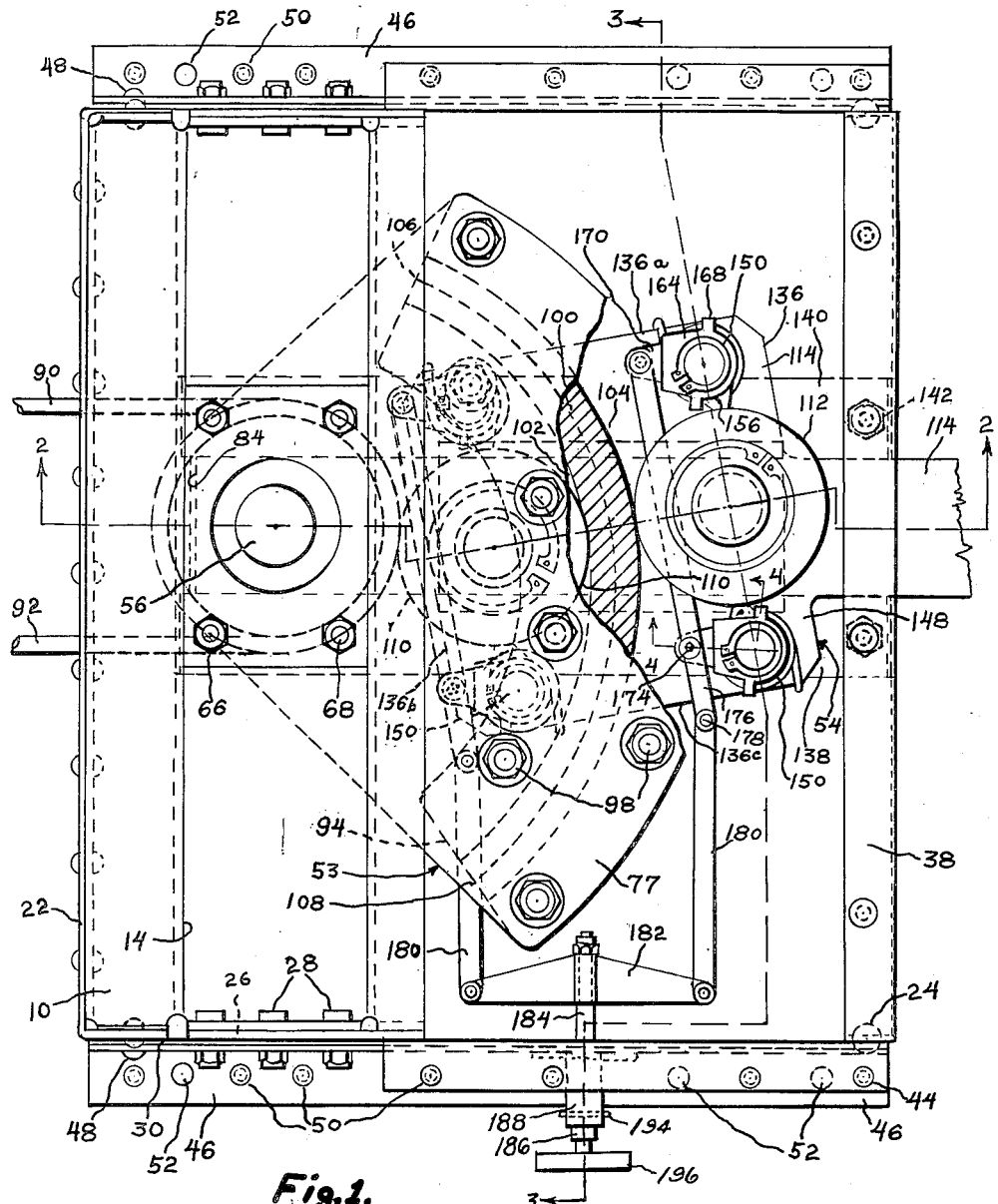
Fig. 1 is a top plan view of a structure built in accordance with the present disclosure, parts being broken away and shown in section, the better to show details of structure.

With reference to the drawings 10 and 12 are main frame members having channel portions 14 and 16 along a middle portion, and their edges terminating in right angle flanges 18 and 20 for union with a housing member 22 by means of rivets or the like 24. Plate members 26 connected to end flanges of the ends of the frame members 10 and 12 rigidly support them in fixed spaced relation at the top and bottom of the housing structure, where they are held in place by screw devices 28 also securing end housing members 30. A bottom housing member 32 is secured by rivets 33 to the face of the bottom frame member 12 and to one flange of a forward channel member 34. A front housing member 36 is secured to the bridge of the channel 34 and to the end flanges of the housing members 30 by means of other rivets 24, the housing member 36 terminating in a flange 38 aligning up with a flange 40 of the frame member 10 to removably support a cover plate 42 which is held in place by screw devices 44. As shown in Figs. 1 and 3, an angle member 46 extends along the side of the housing where it is secured to the ends on the frame member 12 and the channel member 34 by means of rivets 48, other rivets 50 secure the bottom 32 to the angles 46. The angle members 46 are apertured at 52 for tie-down devices when the unit is mounted and coupled with input and output members.

Enclosed within the housing and firmly supported by the frame work there is a rotatable input assembly 53 that is adapted to drive a slidable output assembly 54. The rotatable assembly comprises a shaft 56 fitted at each end with an inner race member 58 for antifriction balls 60 confined by an outer race member 62. The shaft ends extend through apertures 64 in the frame members 10 and 12 where the bearings are supported by blocks 66 secured in the channels 14 and 16 by screw devices 68, as appears in Fig. 1. On the shaft 56 between the inner races 58 at each end there are spacers 70 and 72 abutting the end of a sleeve 74 keyed to the shaft 56 by means of a through bolt and nut 76, so that upon rotation of the shaft 56 the sleeve 74 is caused to rotate, or vice versa. Rigidly connected with the sleeve 74 there is a sweep arm or plate 77 whose hub portions provide a drum or sheave portion 78 with a circular flange 80 for tether and support for an actuating cable, cord or wire 82. A flat 84 on the surface of the drum 78 receives an anchoring collar 86 fixedly secured to the cable 82 and to the drum at 84 where it is locked in place by a clamp bolt and nut 88 passing through the sweep arm and the flange 80. With the sweep arm or plate 77 at substantially the mid point of its range of movement, the clamping and tethering of the cable 82 to the drum 78 is such that each run of cable from the anchorage at 88 winds around and covers about three-quarters of the surface of the drum before it takes off to extend through holes in the housing member 22 to provide the lines 90 and 92. As shown in Fig. 1, the sweep plate is somewhat triangular in shape with the bearings by shaft 56 near the apex of one angle while the opposing side of the triangle is rounded off somewhat. Secured to the plate 77 and bearing a particular relation to the axis of rotation, there is a cam member 94 that engages directly with parts of the slidable assembly 54. The cam member in this instance is a T-shaped element in section that has its stop plate 96 mounted against the under side of the plate 77 where it is secured by bolts and nuts 98, the mid-rib 100 of the cam member depending to provide two cam surfaces 102 and 104. The cam member 94 is so fashioned that the midrib 100, or its mid line follows a particular configuration to satisfy a schedule of desired qualities when the input force is applied. In the illustrated embodiment the mid-rib 100 conforms to a portion of a logarithmic spiral, the end portion 106 being the result of a relatively short radius curve, and the end 108 being the result of a relatively long radius curve with the intervening portion changing gradually.

Immediate coupling between the cam rib 100 of the rotatable assembly 52 and the slidable assembly 54 is effected by a pair of rollers 110 and 112 mounted on a slide member 114, so that the rollers firmly engage the cam faces 102 and 104. Each of the rollers are mounted on antifriction bearings 116 comprising a pair of inner race members 118 engaging balls 120 confined by outer race members 122. A stud shaft 124 engages by its head flange 126 the inner race members 118 and forces them against a spacer 128, fixed to the slide member 114. The stud shaft 124 then passes through the slide member 114 and a clamp plate 130 where it is firmly locked in place by nuts 132. As shown in Fig. 3 the slide member 114 is notched at the under side and along its length to afford a rail portion 134 between plate portions 136. Guide rails 138 and 140 are mounted on top of the frame member 12 and the channel 34, such as by screw devices 142, to provide ways for the rail and plate portions. The proximate side of the guides are rabbeted at 144 to receive the clamp plate 130. That permits the slidable assembly 54 to move along the length of the guides within the limits defined by the cam rib 100 and the rollers 110, 112.

As shown in Fig. 1, the plate portions 136 of the slide 114 resolve themselves into a rectangular body bounded by the lines 136, on the right, 136a on the upper side, 136b on the left and 136c along the lower side. The rectangular body is rotated slightly in a counterclockwise direction to establish a centerline through the axes of the rollers 110 and 112 that is inclined at about 10 degrees from the medial line of the slide 114. Mounted in each corner of the table 148 formed by the plate portions there is a brake assembly 150, there being two brake mechanisms for each roller 110, 112, and all designed to prevent counter-clockwise rotation of the respective roller. Referring to Figs. 3 and 4, at each corner of the table there is a spacer 152 through which a stud or pin 154 extends upwardly after passing through the table, to rotatably support a brake shoe 156. A spring 158 wound about the spacer 152 has an arm 160 engaging the edge of the table 148 and another arm 162 anchored in the shoe 156, the spring being so stressed as to urge the brake shoe 156 into engagement with the surface of the roller. A keeper plate 164 and a snap ring 166 secure the brake assemblies in proper relation.

As shown in Fig. 4, the keeper plate 164 has depending lugs or tangs 168 engageable with eccentric portions of the brake shoes 156 so that rotation of the keeper plate in proper direction will disengage the brake shoes from the rollers. A control arm 170 joins the keeper plate and terminates with an apertured lug 172 pivotally connected at 174 with an actuating link 176. There are, as shown in Fig. 1, two brake assemblies for each roller 110 and 112, and the brake shoes for each roller each have a control arm connected with a link 176. Each link 176 is articulated at 178 to a strap 180 each in turn coupling with a cross head 182 supported on a pull rod 184. The rod 184 passes through the housing member 30 where it is supported by a guide tube 186 that is fastened to the housing member so that the rod may slide in and out for control of the brakes. A lock sleeve 188 is rotatably mounted on the guide tube and has two sets of notches or slots 190, 192 cooperating with a cross pin 194 to fix the setting of the brakes when the knob 196 is actuated.

Referring to Fig. 5, the above described mechanism provides a compact unit 200 that may be installed in the linkage connecting the input or control member 90, 92 with a device 204 to be controlled at a remote point, where there is likely to be developed reaction forces, or kick-backs, that might disturb or deflect the setting of a lever or control 202 at the input end of the unit. Bolts or screws through the tie-down holes 52 will make the unit safe, and cables 90, 92 leading to the pilot's lever 202, with linkage or rods 203 coupled to the slide 114 and rudder or control surface 204 will establish selective irreversible control between the pilot's lever and the particular control surface. Remote control linkage may also be attached to the knob 196 for selecting the reversible or the irreversible status of unit operation.

Whether the linkage will be in the reversible or the irreversible status depends upon whether or not the brakes are lifted or are in engagement with the rollers. If the brakes are disengaged from the rollers, the linkage is reversible, and if the brakes are engaged with the rollers, then the linkage is irreversible. Either status of operation is maintained at will by the coaction of the handle 196 and the sleeve 188.

When the sleeve 188 is rotated so that the deep notch 192 is in line with the cross-pin 194 the handle is permitted to move inward with respect to the frame. This permits the cross-arm 182 and links 180 to move inward allowing the brake arms 164 to rotate clockwise, as urged by the spring 158, permitting the brake shoes 156 to set against the rollers 110, 112. When the brakeshoes are in contact with the rollers, their contact point is so located that they form a friction type roller ratchet which will permit the roller to rotate in a clockwise direction only. Any tendency of the roller to rotate counter-clockwise will set the brakes and prevent rotation of the rollers. When the handle 196 is pulled outward, with respect to the frame, then the sleeve 188 may be rotated so that the shallow slot 190 engages the cross-pin 194 in the handle, thus holding the handle in the outward position. This in turn, through the cross-arm 182 and links 180, 176 causes rotation of the brake-shoe arms 172 in a counterclockwise direction rotating the brakeshoes 156 out of contact with the roller so that the rollers 110, 112 are then free to rotate in both a clockwise and counter-clockwise direction.

Rotation of the cam 94 about the shaft 56 may be produced by pulling on either end of the cable 90, 92 which is secured to the cam drum. The centerline of the cam is designated as a logarithmic spiral having a constant pressure angle or intersection angle with all radial lines extending from the center or the axis of rotation of the cam. In Fig. 1 it can be seen that, if the cam is caused to turn in a counter-clockwise direction, a portion 108 of the cam having a larger radial distance from the axis of the cam rotation than the center portion, will approach the center-line 2—2. This will then cause the rollers 110, 112 contacting the cam to move out and away from the axis of rotation of the cam, also causing the slide 114 to move out. Conversely, the movement of the cam in a clockwise direction will cause the slide 114 to move inward or towards the center of rotation of the cam.

In the case wherein the brake controlling handle 196 is pulled out, releasing the brakeshoes 156 from the rollers 110, 112 the rollers 110, 112 are free to rotate in either direction. Any force applied to either end 90, 92 of the cable 82, will cause rotation of the cam 94 in either clockwise or counter-clockwise direction, which in turn causes the slide 114 to move in or out. As this takes place, the rollers 110, 112 contacting the cam are free to rotate so that a load on the slide is moved with relatively high efficiency. Because of the high efficiency due to the rolling contact of the cam and rollers, the system is now reversible in that a force applied to the slide 114 will cause rotation of the cam 94 and movement of a load on the cable 82.

In the case wherein the brakehandle 196 is permitted to move inward to engage the brakeshoes 156 with the rollers 110, 112 the rollers are free to move in a clockwise direction only. Then, if a force is applied to the cable 90, the cam 94 will turn in a counter-clockwise direction. This causes the slide 114 to move outward against the load on the slide. The movement of the cam surface 104 against the outside roller 112 will cause rolling motion of the roller in a clockwise direction, and due to the rolling motion, a high efficiency is obtained so that the load on the slide can be moved without requiring an overly large force on the cable. However, with the brakes engaged, the force of the load exerted against the slide 114 inward toward the cam tends to move the slide inward and effect clockwise rotation of the cam. A clockwise movement of the cam surface 104 tends to rotate the outside cam roller 112 (transmitting the load from the slide to the cam) in a counter-clockwise direction. The brakeshoes 156 prevent counter-clockwise rotation of the roller 112 and, therefore, clockwise movement of the cam 94 can only take place with sliding action occurring between the cam and roller surfaces. The sliding friction in this case is much greater than rolling friction when the roller is free to rotate. The additional friction in this case is sufficient to reduce the efficiency of the mechanism by an amount, which is related to the angle of the cam surface and the coefficient of friction between the cam and roller. By achieving the proper relationship between the coefficient of friction and cam angle, the efficiency can be reduced to zero and the system made irreversible. When the brakes are set and the irreversible feature is operative, the mechanism is not locked against authorized movement in the direction of load resistance. In this case, where a load is acting on the slide and attempting to drive reversely through the device, the load is so prevented by the irreversible feature as described above. However, by applying a force to the cable end 90 or 92 as the case may be, the cam 100 may be turned in an assisting direction allowing the slide 114 to move with the load. It is not necessary to release the brakes to accomplish this. That is, no other preliminary movement or action of any kind is required to move the load, and backlash can be eliminated from the system. For a specific example, if the load on the slide 114 is acting toward the left it tends to rotate the cam 100 in a clockwise direction which is normally resisted by the barkes preventing counter-clockwise rotation of the roller 112. Then a slight force applied to the cable 92 assists the clockwise rotation of the cam 100 which is followed by the inward movement of the slide until the force applied to the cable 92 is discontinued. The same analysis can be applied to movements of the cam 94 and outward acting loads on the slide 114 with relationship to the inside cam roller 110. Thus, with the brakes out of engagement, this mechanism provides a completely reversible device such that forces applied to the output slide can do work or overcome loads applied to the input cable. Also, when the brakes are applied, the reversible system is still in effect so far as forces acting on the input cable are able to move a load attached to the slide yet the system becomes irreversible the moment a force on the slide tries to transmit any load to the input cables.

While the embodiment of the present invention as herein disclosed, constitutes a preferred form, it is to be understood that other forms might be adopted.

What is claimed is as follows:

1. In a motion translating unit between an input member and an output member, a rigidly supported framework, a rotatable assembly carried by the framework and responsive to movement of the input member, a slidable assembly carried by the framework and movable toward and from the rotatable assembly for actuating the output member, interengaging means provided by the rotatable assembly and the slidable assembly for actuating the output member upon movement of the input member, and means including parts of both assemblies for effecting movement of either one upon actuation of the other, selectively actuatable means carried by said slidable assembly and operable upon the interengaging means for altering the resistance to reverse movement of said rotatable assembly upon actuation of said slidable assembly, manually operable means carried by said framework for controlling the selectively actuatable means, and articulated linkage connecting the manually operable means with the selectively actuatable means whereby the selectively actuatable means may be manually adjusted in any position of the slidable assembly with respect to the said framework.

2. In a selectively irreversible linkage between an input member and an output member, a compact unit having an oscillatable assembly, means connected with the input member for selectively oscillating said assembly, a reciprocable assembly in said unit for actuating said output member, a cam web actuated by the oscillatable assembly and interengaging between a pair of spaced rollers carried by the reciprocable assembly for effecting movement of either one upon actuation of the other, selectively actuatable spring pressed brake shoes normally engaging the rollers carried by said reciprocable assembly and operable upon the interengaging means for resisting movement of said oscillatable assembly by actuation of the reciprocable assembly, and manually operable means mounted on said unit and connected with said reciprocable assembly for disengaging the spring pressed brakes for controlling the effect of said irreversible linkage.

3. In a selectively irreversible linkage between an input member, a compact unit having an oscillatable assembly, means connected with the input number for selectively oscillating said assembly, a reciprocable assembly in said unit, means connected with said reciprocable assembly for actuating said output member, interengaging means including parts of both assemblies for effecting movement of either one upon actuation of the other, selectively actuatable means carried by said reciprocable assembly and operable upon the interengaging means for altering the resistance to movement of said oscillatable assembly upon actuation of the reciprocable assembly, and manually operable means for controlling the effect of said selectively actuatable means, said interengaging means includes a pair of fixedly spaced rollers mounted on parallel axes carried by the reciprocable assembly, a double faced cam web carried on the oscillatable assembly and disposed between and in contact with the spaced rollers, and means comprising a part of said selectively actuatable means for controlling the rotation of said rollers.

4. In a selectively irreversible linkage between an input member, a compact unit having an oscillatable assembly, means connected with the input member for selectively oscillating said assembly, a reciprocable assembly in said unit, means connected with said reciprocable assembly for actuating said output member, interengaging means including parts of both assemblies for effecting movement of either one upon actuation of the other, selectively actuatable means carried by said reciprocable assembly and operable upon the interengaging means for altering the resistance to movement of said oscillatable assembly upon actuation of the reciprocable assembly, and manually operable means for controlling the effect of said selectively actuatable means, said interengaging means includes a cam web carried by the oscillatable assembly and generated about the axis of oscillation as a logarithmic spiral, a pair of rollers carried by the reciprocable assembly and spaced apart each to frictionally engage an opposite side of said cam web, a common line passing through the axes of said rollers bearing an angle with the center line passing through both assemblies.

5. In a selectively irreversible linkage between an input member, a compact unit having an oscillatable assembly, means connected with the input number for selectively oscillating said assembly, a reciprocable assembly in said unit, means connected with said reciprocable assembly for actuating said output member, interengaging means including parts of both assemblies for effecting movement of either one upon actuation of the other, selectively actuatable means carried by said reciprocable assembly and operable upon the interengaging means for altering the resistance to movement of said oscillatable assembly upon actuation of the reciprocable assembly, and manually operable means for controlling the effect of said selectively actuatable means, said interengaging means includes a pair of spaced rollers, parallel shafts carried by the reciprocable assembly and antifriction bearings cooperating with the shafts for supporting said rollers, disengageable brake shoes with spring means normally restraining said rollers against rotation in one direction, a cam web carried by said oscillatable assembly engageable with said rollers for rotating them in a direction opposite to the restrained rotation.

6. In a selectively irreversible linkage between an input member, a compact unit having an oscillatable assembly, means connected with the input number for selectively oscillating said assembly, a reciprocable assembly in said unit, means connected with said reciprocable assembly for actuating said output member, interengaging means including parts of both assemblies for effecting movement of either one upon actuation of the other, selectively actuatable means carried by said reciprocable assembly and operable upon the interengaging means for altering the resistance to movement of said oscillatable assembly upon actuation of the reciprocable assembly, and manually operable means for controlling the effect of said selectively actuatable means, said interengaging means includes a pair of spaced rollers, parallel shafts carried by the reciprocable assembly and antifriction bearings cooperating with the shafts for supporting said rollers, a pair of stud shafts arranged parallel each with a roller shaft, brake shoes pivotally supported on the stud shafts, spring means operable upon the brake shoes urging them into engagement each with a roller to prevent rotation of the roller in one direction, a double faced cam element carried by the oscillatable assembly and disposed in engagement with the rollers, whereby movement of the oscillatable assembly rotates the rollers in the opposite direction.

WILLIAM H. KUNTZ.

REFERENCES CITED

The following references are of record in the file of this patent:

UNITED STATES PATENTS

| Number | Name | Date |
| --- | --- | --- |
| 262,632 | Whittaker | Aug. 15, 1882 |
| 1,320,590 | Waters | Nov. 4, 1919 |
| 2,444,886 | Vickers | July 6, 1948 |